(12) United States Patent
Tsuruoka et al.

(10) Patent No.: US 11,014,552 B2
(45) Date of Patent: May 25, 2021

(54) DRIVING ASSIST APPARATUS

(71) Applicant: TOYOTA JIDOSHA KABUSHIKI KAISHA, Toyota (JP)

(72) Inventors: Noriyuki Tsuruoka, Susono (JP); Kohei Morotomi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 15/976,559

(22) Filed: May 10, 2018

(65) Prior Publication Data
US 2018/0326979 A1 Nov. 15, 2018

(30) Foreign Application Priority Data
May 12, 2017 (JP) .............................. JP2017-095485

(51) Int. Cl.
*B60W 30/09* (2012.01)
*B60W 30/095* (2012.01)
(Continued)

(52) U.S. Cl.
CPC ............ *B60W 30/09* (2013.01); *B60W 10/18* (2013.01); *B60W 10/184* (2013.01);
(Continued)

(58) Field of Classification Search
CPC .... B60W 10/00; B60W 10/18; B60W 10/184; B60W 10/20; B60W 2050/143; B60W 2520/00; B60W 2520/10; B60W 2540/00; B60W 2540/18; B60W 2550/00; B60W 2550/10; B60W 2720/00; B60W 2720/10; B60W 2720/24; B60W 30/00;
(Continued)

(56) References Cited

U.S. PATENT DOCUMENTS

2012/0035846 A1* 2/2012 Sakamoto ........... B60T 8/17558
701/301
2012/0123643 A1* 5/2012 Limpibuntering ..... B62D 1/286
701/42

(Continued)

FOREIGN PATENT DOCUMENTS

CN 108569285 A 9/2018
JP H05-024524 A 2/1993
(Continued)

*Primary Examiner* — Charles J Han
(74) *Attorney, Agent, or Firm* — Hunton Andrews Kurth LLP

(57) ABSTRACT

Disclosed is a driving assist apparatus which executes a process for collision avoidance when the possibility of collision of a vehicle with an obstacle is high. When the steering angle of the steering wheel is greater than an angle threshold, the apparatus determines that a driver is trying to avoid the collision by operating the steering wheel and does not execute the collision avoidance process. When the vehicle is making a right turn or a left turn, there arises a possibility that the collision avoidance process is not executed even in a situation where the collision avoidance process must be executed. In view of this, when the vehicle is making a right turn or a left turn, the angle threshold mentioned above is set to a larger value as compared with the case where the vehicle is not making a right turn or a left turn.

2 Claims, 8 Drawing Sheets

(51) Int. Cl.
*B60W 50/14* (2020.01)
*B60W 10/18* (2012.01)
*B60W 10/20* (2006.01)
*B60W 10/184* (2012.01)

(52) U.S. Cl.
CPC ........ *B60W 10/20* (2013.01); *B60W 30/0956* (2013.01); *B60W 50/14* (2013.01); *B60W 2050/143* (2013.01); *B60W 2520/10* (2013.01); *B60W 2540/18* (2013.01); *B60W 2554/00* (2020.02); *B60W 2720/10* (2013.01); *B60W 2720/24* (2013.01)

(58) Field of Classification Search
CPC .... B60W 30/08; B60W 30/09; B60W 30/095; B60W 30/0956; B60W 50/00; B60W 50/08; B60W 50/14
See application file for complete search history.

(56) References Cited

U.S. PATENT DOCUMENTS

2017/0259793 A1    9/2017   Ohmori et al.
2018/0257644 A1    9/2018   Morotomi et al.

FOREIGN PATENT DOCUMENTS

JP        2004224309 A    8/2004
JP        2016-101892 A    6/2016

* cited by examiner

DRIVING ASSIST APPARATUS

CROSS-REFERENCE TO RELATED APPLICATION

The present application claims priority to Japanese Patent Application No. 2017-095485 filed on May 12, 2017, which is incorporated herein by reference in its entirety.

BACKGROUND OF THE INVENTION

Field of the Invention

The present invention relates to a driving assist apparatus which detects an obstacle present in the heading direction of a vehicle and executes a process for collision avoidance when the vehicle is highly likely to collide with the obstacle.

Description of the Related Art

When the possibility of a vehicle colliding with an obstacle is high, one of conventionally known driving assist apparatuses of such a type (hereinafter also referred to as "a conventional apparatus") executes an automatic braking process of calculating a deceleration required for collision avoidance (required deceleration) and controlling the brake of the vehicle on the basis of the required deceleration, as well as a process (warning process) of providing a warning to a driver of the vehicle.

At that time, if the driver is operating the brake pedal of the vehicle, the conventional apparatus determines that the driver has recognized approach of the obstacle and is trying to avoid collision with the obstacle through brake operation. In this case, the conventional apparatus does not execute the warning process. In addition, the conventional apparatus controls the brake on the basis of a larger one of the above required deceleration and the deceleration demanded by the driver through the brake operation (see Japanese Patent Application Laid-Open (kokai) No. 2016-101892).

Incidentally, in some cases, the driver having recognized approach of the obstacle tries to avoid collision with the obstacle by operating the steering wheel of the vehicle. In such a case, if the driver performs no brake operation, the conventional apparatus executes the warning process and the automatic braking process.

As a result, the warning process is executed for the driver who is operating the steering wheel so as to avoid collision with the obstacle, so that the driver may feel an unpleasant feeling. In addition, because of the automatic braking process, the vehicle may stop at a position at which the driver does not intend to stop the vehicle. In other words, it is unnecessary to execute the warning process and the automatic braking process when the driver is operating the steering wheel so as to avoid collision with the obstacle. However, the conventional apparatus is not configured to determine whether to execute the warning process and the automatic braking process, on the basis of the driver's steering wheel operation.

In view of the above, the driving assist apparatus may be configured such that, when the operation amount of the steering wheel (namely, the magnitude of steering angle) is greater than a predetermined angle threshold, the driving assist apparatus determines that the driver is operating the steering wheel so as to avoid collision with the obstacle, and does not execute the process (collision avoidance process) of avoiding collision with the obstacle. However, in this case, when the magnitude of steering angle becomes greater than the angle threshold as a result of the vehicle making a right turn or a left turn, the driving assist apparatus may fail to execute the collision avoidance process even in a situation where the collision avoidance process must be executed.

In view of the forgoing, one object of the present invention is to provide a driving assist apparatus for a vehicle which can properly determine whether to execute a collision avoidance process when the possibility of collision with an obstacle is high, on the basis of a driver's steering wheel operation, even when the vehicle is making a right turn or a left turn.

A driving assist apparatus of the present invention which achieves the above-described object (hereinafter also referred to as "the apparatus of the present invention") includes an obstacle detection section, a steering angle sensor, a collision possibility determination section, an execution condition determination section, and a collision avoidance process execution section.

Said obstacle detection section (a millimeter wave radar 41 and a front camera 42) detects "an obstacle" present in a heading direction of a vehicle (10).

Said steering angle sensor (45) detects "steering angle ($\theta$s) which is the rotational position of a steering wheel of said vehicle represented by the "operation direction" of said steering wheel and the "operation amount" of said steering wheel from its neutral position.

Said collision possibility determination section (a driving assist ECU 20) determines whether or not a possibility of said vehicle colliding with said detected obstacle is high (steps 710 to 720 of FIG. 7).

Said execution condition determination section (the driving assist ECU 20) determines that "a process execution condition" is satisfied (step 760 of FIG. 7) when said detected steering angle falls within a range between a rotational position which is a clockwise direction reference position which said steering wheel reaches when said operation direction is a clockwise direction and said operation amount is a predetermined first angle ($\theta$th1) and another rotational position which is a counterclockwise direction reference position which said steering wheel reaches when said operation direction is a counterclockwise direction and said operation amount is a predetermined second angle ($\theta$th2).

Said collision avoidance process execution section (the driving assist ECU 20) executes a collision avoidance process, including at least one of a process of providing a warning to a driver of said vehicle and a process of decreasing speed of said vehicle (step 740 of FIG. 7), when said collision possibility determination section determines that the possibility of said vehicle colliding with said obstacle is high and said execution condition determination section determines that said process execution condition is satisfied (when a "Yes" determination is made in any of step 730, step 750, and step 760 of FIG. 7).

Further, said execution condition determination section executes at least one of "a clockwise adjustment process" of changing said clockwise direction reference position to a predetermined third angle ($\theta$th3) larger than said first angle when said vehicle is determined to be making a right turn (step 725 and step 730 of FIG. 7), and "a counterclockwise adjustment process" of changing said counterclockwise direction reference position to a predetermined fourth angle ($\theta$th4) larger than said second angle when said vehicle is determined to be making a left turn (step 745 and step 750 of FIG. 7).

In the case where the driver greatly operates the steering wheel in the clockwise direction by an amount greater than the first angle without causing the vehicle to make a right turn or a left turn, even when the possibility of collision with the obstacle is high, the apparatus of the present invention determines that the driver is trying to avoid the collision by operating the steering wheel, and the apparatus of the present invention does not execute the collision avoidance process. Similarly, in the case where the driver greatly operates the steering wheel in the counterclockwise direction by an amount greater than the second angle without causing the vehicle to make a right turn or a left turn, even when the possibility of collision with the obstacle is high, the apparatus of the present invention determines that the driver is trying to avoid the collision by operating the steering wheel, and the apparatus of the present invention does not execute the collision avoidance process.

Meanwhile, in the case where the vehicle is making a right turn, the operation amount of the steering wheel in the clockwise direction may become relatively large even when the driver is not trying to avoid collision with an obstacle. In addition, when the driver operates the steering wheel so as to avoid collision with an obstacle while the vehicle is making a right turn, the steering wheel may be operated further greatly in the clockwise direction or the steering wheel may be operated in the counterclockwise direction.

In view of the forgoing, in the case where the possibility of the vehicle colliding with an obstacle is high and the vehicle is making a right turn, even when the driver operates the steering wheel in the clockwise direction by an amount greater than the first angle, the apparatus of the present invention executes the collision avoidance process if the operation amount is equal to or less than the third angle. In contrast, in the case where the driver operates the steering wheel in the clockwise direction by an amount greater than the third angle or in the counterclockwise direction by an amount greater than the second angle while the vehicle is making a right turn, the apparatus of the present invention determines that the driver is trying to avoid collision with the obstacle by operating the steering wheel, and the apparatus of the present invention does not execute the collision avoidance process.

Similarly, in the case where the possibility of the vehicle colliding with an obstacle is high and the vehicle is making a left turn, even when the driver operates the steering wheel in the counterclockwise direction by an amount greater than the second angle, the apparatus of the present invention executes the collision avoidance process if the operation amount is equal to or less than the fourth angle. In contrast, in the case where the driver operates the steering wheel in the counterclockwise direction by an amount greater than the fourth angle or in the clockwise direction by an amount greater than the first angle while the vehicle is making a left turn, the apparatus of the present invention determines that the driver is trying to avoid collision with the obstacle by operating the steering wheel, and the apparatus of the present invention does not execute the collision avoidance process.

In other words, the apparatus of the present invention changes the condition (process execution condition) for determining whether or not the driver is trying to avoid collision with the obstacle by operating the steering wheel, in accordance with the traveling state of the vehicle (specifically, one of the state in which the vehicle is making a right turn, the state in which the vehicle is making a left turn, and the state in which the vehicle is making neither a right turn nor a left turn). Therefore, in the case where the possibility of collision with an obstacle is high, the apparatus of the present invention can properly determine whether to execute the collision avoidance process, on the basis of the steering wheel operation by the driver, even when the vehicle is making a right turn or a left turn. Notably, the apparatus of the present invention may be configured to execute only the clockwise adjustment process without executing the counterclockwise adjustment process. Alternatively, the apparatus of the present invention may be configured to execute only the counterclockwise adjustment process without executing the clockwise adjustment process.

In one mode of the present invention, said execution condition determination section executes at least one of a process of determining that said vehicle is making a right turn in the case where a state in which said operation direction is in the clockwise direction and said operation amount is larger than a predetermined clockwise angle threshold ($\theta$Rth) continues beyond a predetermined clockwise continuation time (Tth2) at the time when said clockwise adjustment process is performed (step 725 of FIG. 7), and a process of determining that said vehicle is making a left turn in the case where a state in which said operation direction is in the counterclockwise direction and said operation amount is larger than a predetermined counterclockwise angle threshold ($\theta$Lth) continues beyond a predetermined counterclockwise continuation time (Tth2) at the time when said counterclockwise adjustment process is performed (step 745 of FIG. 7).

For example, it may be possible to determine that the vehicle is making a right turn or a left turn when the operation amount of the steering wheel becomes greater than the predetermined threshold. However, the the operation amount of the steering wheel may become large temporarily even when the driver avoids collision with an obstacle present in the heading direction of the vehicle rather than causing the vehicle to make a right turn or a left turn (see a broken line arrow L12 of FIG. 3). Meanwhile, when the vehicle is making a right turn or a left turn, a state in which the operation amount of the steering wheel is relatively large continues for a certain period of time (see a broken line arrow L22 of FIG. 4 and a broken line arrow L32 of FIG. 5).

In view of the foregoing, the apparatus of the present mode determines that the vehicle is making a right turn or a left turn when a state in which the operation amount of the steering wheel is greater than a predetermined amount continues beyond a predetermined time. Therefore, according the present mode, the determination as to whether or not the vehicle is making a right turn or a left turn can be made accurately by a simple process.

Notably, said steering angle sensor and said execution condition determination section may be defined as follows.

Namely, said steering angle sensor detects the steering angle of a steering wheel of said vehicle.

In addition, said execution condition determination section determines that a process execution condition is satisfied when said detected steering angle falls within a predetermined angular range.

Further, said execution condition determination section executes at least one of a process of expanding said angular range when said vehicle is determined to be making a right turn such that said angular range becomes wider as compared with said angular range in the case where said vehicle is not determined to be making a right turn, and a process of expanding said angular range when said vehicle is determined to be making a left turn such that said angular range becomes wider as compared with said angular range in the case where said vehicle is not determined to be making a left turn.

In another mode of the present invention, said execution condition determination section executes at least one of a process of determining that said vehicle is making a right turn in the case where said steering angle represents "a state in which the operation direction of said steering wheel is the clockwise direction and the operation amount of said steering wheel is larger than a predetermined right turn angle" and a process of determining that said vehicle is making a left turn in the case where said steering angle represents "a state in which the operation direction of said steering wheel is the counterclockwise direction and the operation amount of said steering wheel is larger than a predetermined left turn angle."

According the present mode, the determination as to whether or not the vehicle is making a right turn or a left turn can be made by a simpler process.

Notably, in the above description, in order to facilitate understanding of the present invention, the constituent elements of the invention corresponding to those of an embodiment of the invention which will be described later are accompanied by parenthesized names and/or symbols which are used in the embodiment; however, the constituent elements of the invention are not limited to those in the embodiment defined by the names and/or the symbols. Other objects, other features, and attendant advantages of the present invention will be readily appreciated from the following description of the embodiment of the invention which is made with reference to the accompanying drawings.

DESCRIPTION OF THE PREFERRED EMBODIMENTS

Figure 1:
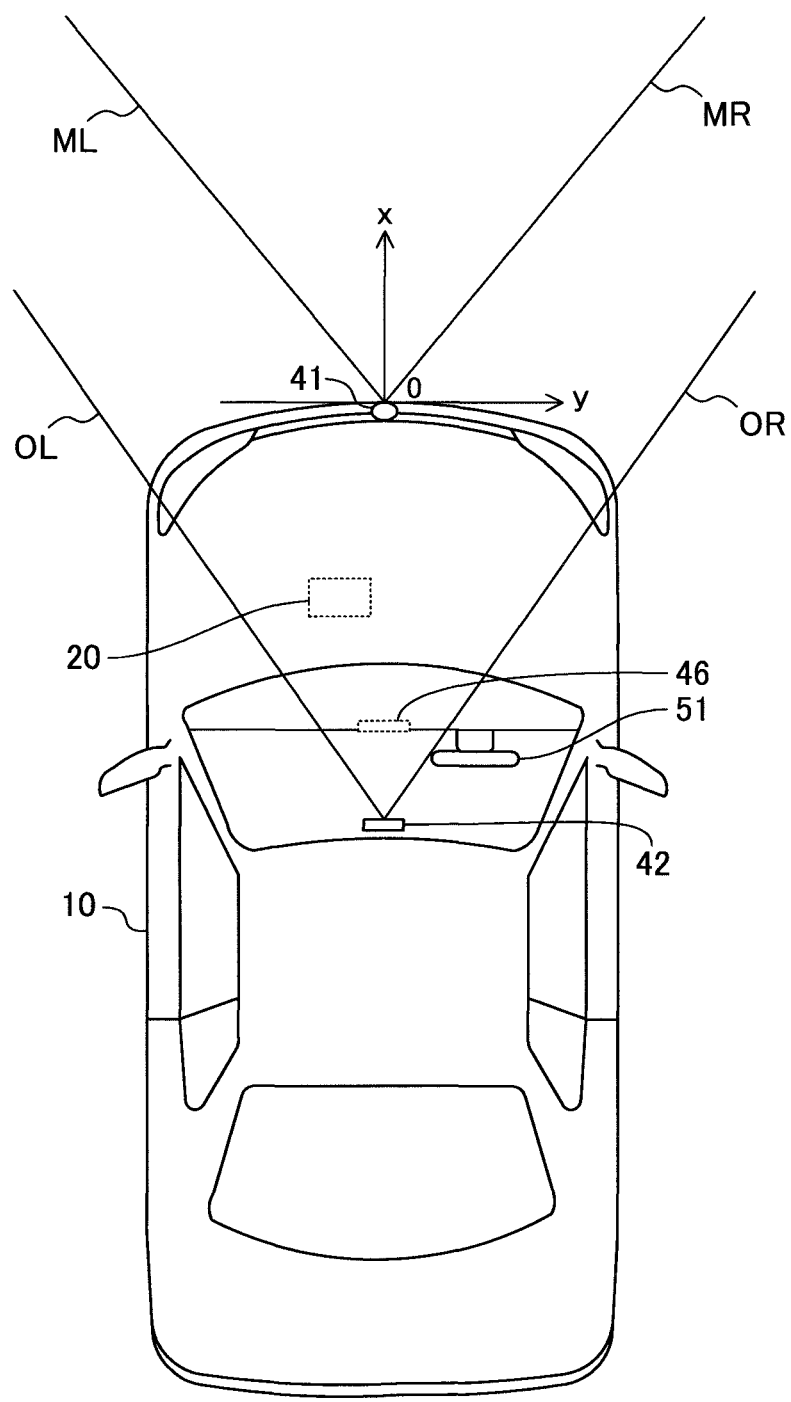
FIG. 1 is a schematic diagram of a vehicle (present vehicle) on which a driving assist apparatus according to an embodiment of the present invention (present assist apparatus) is mounted.

A driving assist apparatus according to an embodiment of the present invention (hereinafter also referred to as "the present assist apparatus") will now be described with reference to the drawings. The present assist apparatus is applied to a vehicle 10 shown in FIG. 1. FIG. 2 shows a block diagram of the present assist apparatus. The present assist apparatus includes "a driving assist ECU 20, an engine ECU 31, and a brake ECU 32" each of which is an electronic control unit (ECU).

The driving assist ECU 20 includes a CPU, a ROM, and a RAM. The CPU performs data reading, numerical computation, computation result output, etc. by executing predetermined programs (routines) as required. The ROM stores the programs executed by the CPU, lookup tables (maps), etc. The RAM stores data temporarily.

Like the driving assist ECU 20, each of the engine ECU 31 and the brake ECU 32 includes a CPU, a ROM, and a RAM. These ECUs can perform data communication (can exchange data) with one another through a CAN (controller area network) 34. In addition, through the CAN 34, each ECU can receive from "other ECUs" output values of sensors connected to the other ECUs.

The driving assist ECU 20 is connected to a millimeter wave radar 41, a front camera 42, a vehicle speed sensor 43, an acceleration sensor 44, a steering angle sensor 45, an input output device 46, and speakers 47.

The millimeter wave radar 41 transmits a millimeter wave (electromagnetic wave whose frequency falls within the range of 30 GHz to 300 GHz) toward a region ahead of the vehicle 10, and receives its reflected wave. On the basis of the transmitted wave and the reflected wave, the millimeter wave radar 41 obtains, as target information, the position (relative position) of a target present ahead of the vehicle 10 in relation to the vehicle 10, the speed (relative speed) of the target in relation to the vehicle 10, the angle of the left end of the target in relation to the vehicle 10, and the angle of the right end of the target in relation to the vehicle 10. The millimeter wave radar 41 outputs the obtained target information to the driving assist ECU 20. The searching range of the millimeter wave radar 41 in the horizontal direction is equal to a range represented by an angle (angle less than 180°) formed between a straight line ML and a straight line MR shown in FIG. 1.

The front camera 42 is disposed at a position near a room mirror (not shown) provided at an upper position within the compartment of the vehicle 10. The front camera 42 captures an image of a region in front of the vehicle 10 (hereinafter also referred to as "the frontward image") and outputs a signal representing the frontward image to the driving assist ECU 20. The angle of view (field of view) of the front camera 42 in the horizontal direction is equal to a range represented by an angle (angle less than 180°) formed between a straight line OL and a straight line OR shown in FIG. 1.

The vehicle speed sensor 43 detects the vehicle speed Vs of the vehicle 10 and outputs a signal representing the vehicle speed Vs to the driving assist ECU 20.

The acceleration sensor 44 detects the acceleration As of the vehicle 10 in the longitudinal direction (the amount of change in the vehicle speed Vs per unit time).

The steering angle sensor 45 is disposed on a steering shaft (not shown) coupled with a steering wheel 51 (see FIG. 1) of the vehicle 10. The steering angle sensor 45 outputs a signal representing steering angle θs which is the rotational angle of the steering wheel 51 of the vehicle 10. The steering angle θs becomes "0" when the steering wheel 51 is located at its neutral position. The steering angle θs assumes a positive value when the steering wheel 51 is operated in the clockwise direction from the neutral position and assumes a negative value when the steering wheel 51 is operated in the counterclockwise direction from the neutral position.

The input output device 46 is disposed on the dashboard of the vehicle 10. The input output device 46 includes a display unit (liquid crystal display). Characters, figures, etc. displayed on the display unit of the input output device 46 are controlled by the driving assist ECU 20. The display unit of the input output device 46 also functions as a touch panel. Accordingly, a driver can send instructions to the driving assist ECU 20 by touching the display unit.

The speakers 47 are respectively disposed inside the left and right front doors (not shown) of the vehicle 10 (within the vehicle compartment). The speakers 47 can produce sounds such as a warning sound and a voice message in accordance with instructions from the driving assist ECU 20.

The engine ECU 31 is connected to a plurality of engine sensors 61 and receives detection signals from these sensors. The engine sensors 61 detect the operation state quantities of the engine 62 which is a drive source of the vehicle 10. The engine sensors 61 include an accelerator pedal operation amount sensor, a throttle valve opening sensor, an engine speed sensor, an intake air amount sensor, etc.

Further, the engine ECU 31 is connected to engine actuators 63, such as a throttle valve actuator and a fuel injection valve, and a transmission 64. The engine ECU 31 changes the drive torque Tq generated by the engine 62 and the gear ratio Rg of the transmission 64 by controlling the engine actuators 63 and the transmission 64. Thus, the engine ECU 31 adjusts the drive force of the vehicle 10, to thereby control the acceleration As. Further, the driving assist ECU 20 drives the engine actuators 63 and the transmission 64 by sending instructions to the engine ECU 31. Thus, the driving assist ECU 20 can change the driving force of the vehicle 10.

The brake ECU 32 is connected to a plurality of brake sensors 65 and receives detection signals from these sensors. The brake sensors 65 detect parameters used for controlling an unillustrated "brake (hydraulic frictional brake) mounted on the vehicle 10." The brake sensors 65 include an operation amount sensor for detecting the operation amount of a brake pedal (not shown), wheel speed sensors for detecting the rotational speeds of the wheels, etc.

Further, the brake ECU 32 is connected to a brake actuator 66. The brake actuator 66 is a hydraulic control actuator. The brake actuator 66 is provided in a hydraulic circuit extending between a master cylinder which pressurizes hydraulic oil by using the depressing force applied to the brake pedal and the friction brake including well-known wheel cylinders provided in the wheels. The hydraulic circuit, the master cylinder, and the friction brake are not shown in the drawings. The brake actuator 66 adjusts the oil pressure supplied to the wheel cylinders. The brake ECU 32 generates a brake force (frictional brake force) Bf applied to the wheels, by driving the brake actuator 66, so as to control the acceleration As (in this case, negative acceleration; namely, deceleration) of the vehicle 10. Further, the driving assist ECU 20 drives the brake actuator 66 by sending an instruction to the brake ECU 32. Thus, the driving assist ECU 20 can change the brake force Bf.

(Collision Avoidance Process)

Next, there will be described a collision avoidance process which is executed by the driving assist ECU 20 in the case where the possibility of collision of the vehicle 10 with an obstacle is high. The driver of the vehicle 10 can switch the state of request of the collision avoidance process, by operating the input output device 46, between an ON state for permitting the execution of the collision avoidance process and an OFF state for prohibiting the execution of the process.

First, a method by which the driving assist ECU 20 detects an obstacle will be described. The driving assist ECU 20 obtains a lateral distance (the y coordinate value of the lateral center) $Dy(n)$ of a target (n) present in a region in front of the vehicle 10, a longitudinal distance (inter-vehicle distance) $Dx(n)$ of the target (n), a relative lateral speed $Vy(n)$ of the target (n), a relative longitudinal speed $Vx(n)$ of the target (n), and a lateral width $Wd(n)$ of the target (n) on the basis of the target information received from the millimeter wave radar 41 and the frontward image received from the front camera 42. The relative lateral speed $Vy(n)$ is the amount of change in the lateral distance $Dy(n)$ per unit time, and the relative longitudinal speed $Vx(n)$ is the amount of change in the longitudinal distance $Dx(n)$ per unit time.

Figure 2:
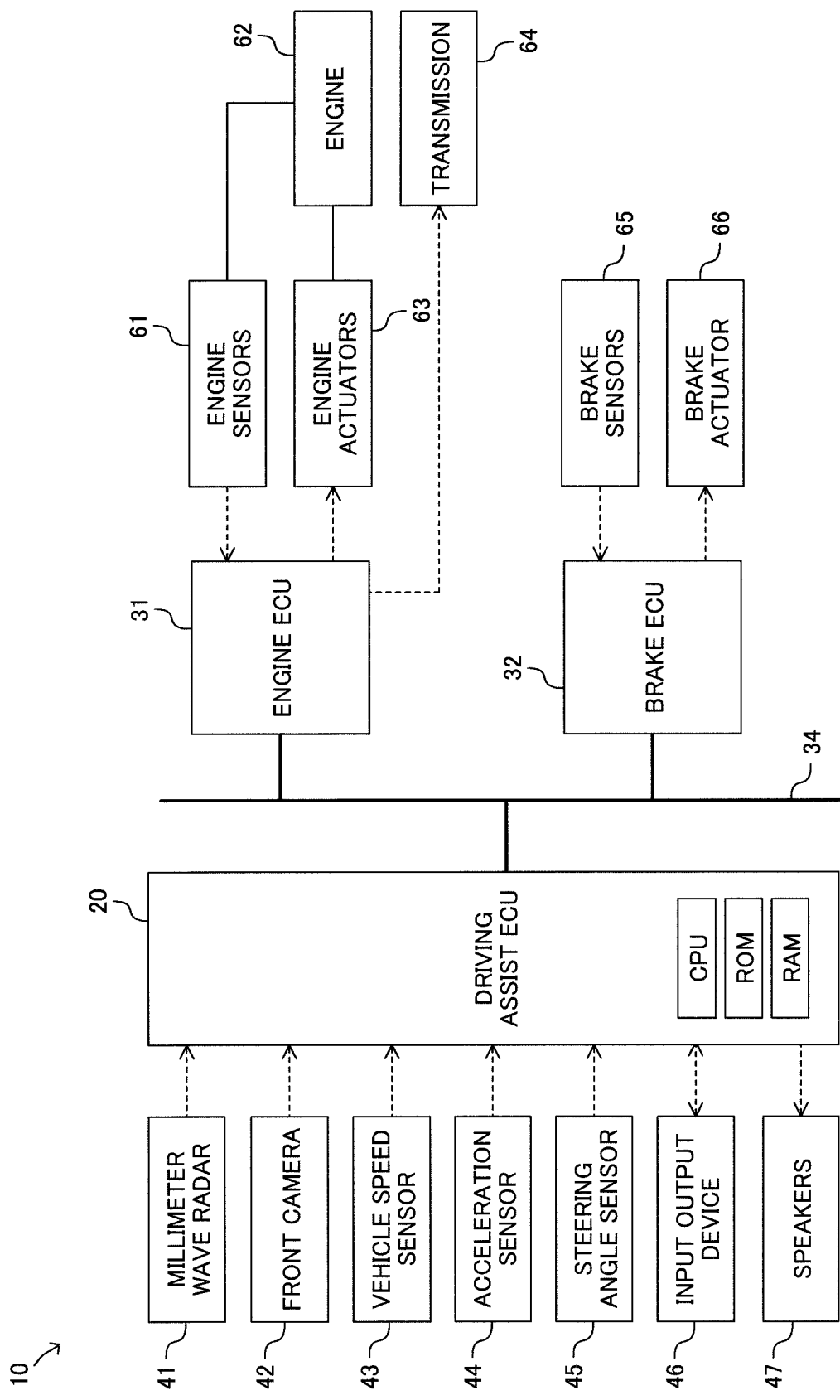
FIG. 2 is a block diagram of the present assist apparatus.

Notably, as shown in FIG. 1, the longitudinal direction of the vehicle 10 is defined as an x axis, and the lateral direction of the vehicle 10 is defined as a y axis. The lateral center of a front end of the vehicle 10 is the origin where x=0 and y=0. The x coordinate assumes a positive value in the front direction of the vehicle 10 and assumes a negative value in the rear direction of the vehicle 10. The y coordinate assumes a positive value in the right direction of the vehicle 10 and assumes a negative value in the left direction of the vehicle 10. The symbol (n) is an identifier added to each target. In the present embodiment, "n" is a natural number.

On the basis of a moving locus of the target (n), the driving assist ECU 20 estimates an approach lateral distance $Dyr(n)$, which is the lateral distance $Dy(n)$ at the time when the longitudinal distance $Dx(n)$ of the target (n) becomes zero, under the assumption that the vehicle speed Vs and the steering angle θs do not change and the moving speed, moving direction, etc. of the target (n) do not change. If the following equation (1) regarding the approach lateral distance $Dyr(n)$ holds, the driving assist ECU 20 determines that the target (n) is an obstacle (a) which is likely to collide with the vehicle 10. The symbol (a) is the identifier of the target determined to be an obstacle (accordingly, "a" is a natural number). The target determined to be an obstacle is referred to as "the obstacle (a)" for convenience' sake.

$$|Dyr(n)|<Wo/2+Wd(n)/2+Lm \qquad (1)$$

Here, Wo is the width (length in the lateral direction) of the vehicle 10, and Lm is a predetermined length (collision determination margin).

More specifically, the relation represented by the above equation (1) is a relation which is satisfied when both the following conditions (C1) and (C2) regarding the target (n) are satisfied.

Condition (C1): The left end (a position whose y coordinate is represented by $Dyr(n)-Wd/2$) of the target (n) when the longitudinal position $Dx(n)$ of the target (n) becomes zero is located on the left side of a position (a position whose y coordinate is represented by Wo/2+Lm) which is separated rightward, by the collision determination margin Lm, from the right end of the vehicle 10 (namely, $Dyr(n)-Wd/2<Wo/2+Lm$).

Condition (C2): The right end (the position whose y coordinate is represented by $Dyr(n)+Wd/2$) of the target (n) when the longitudinal position $Dx(n)$ of the target (n) becomes zero is located on the right side of a position (a position whose y coordinate is represented by $-Wo/2-Lm$) which is separated leftward, by the collision determination margin Lm, from the left end of the vehicle 10 (namely, $-Wo/2-Lm<Dyr(n)+Wd/2$).

Figure 3:
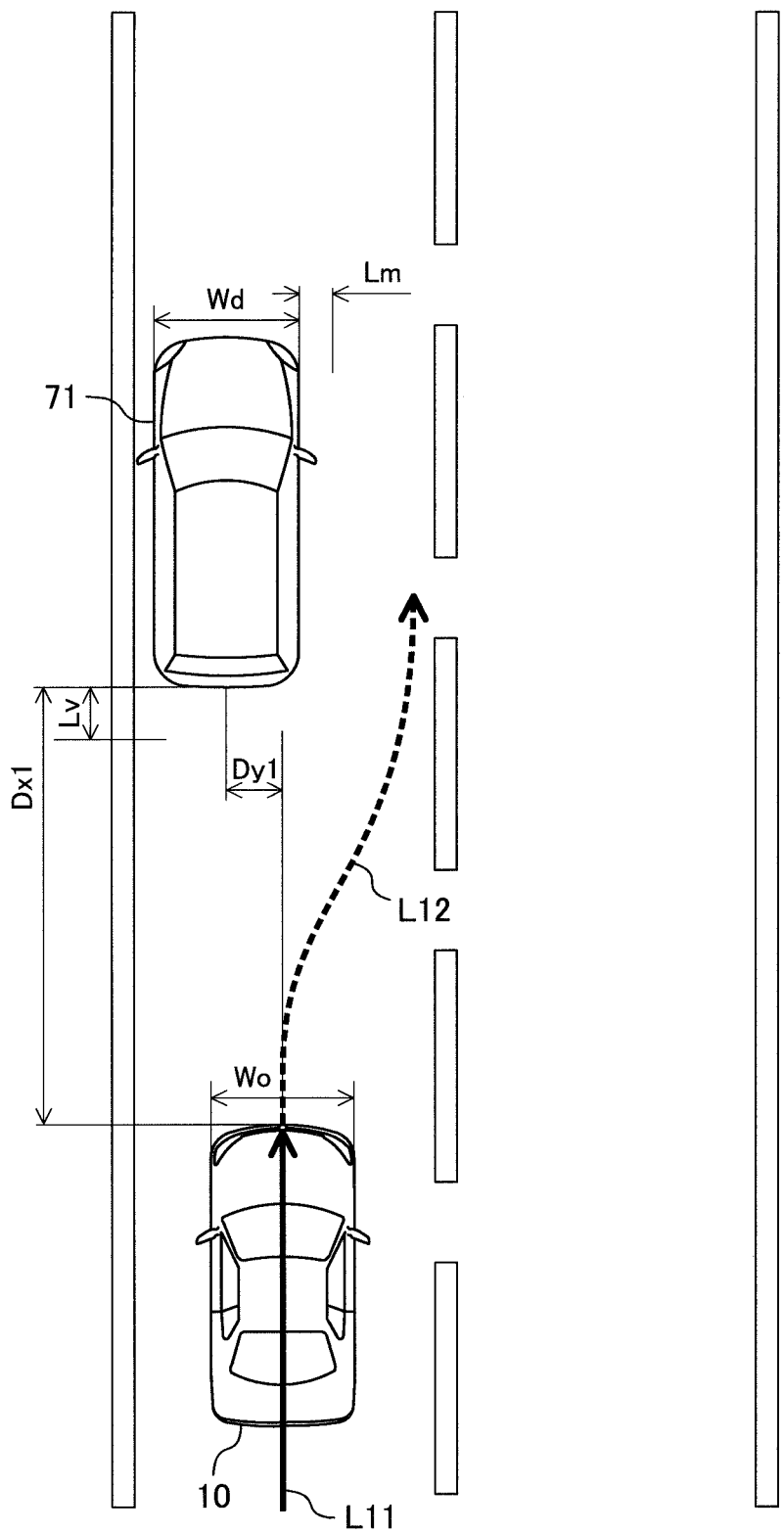
FIG. 3 is an illustration showing the present vehicle traveling straight on a road and another vehicle (collision obstacle) which is highly likely to collide with the present vehicle.

FIG. 3 is a plan view showing the case where a vehicle 71 is the obstacle (a) for the vehicle 10. The identifier of the vehicle 71 is set to (1) for convenience' sake. In the example of FIG. 3, the longitudinal distance Dx(1) between the vehicle 10 and the vehicle 71 is Dx1. In addition, the lateral distance Dy(1) between the vehicle 10 and the vehicle 71 is a negative value, and the magnitude of the lateral distance Dy(1) is Dy1. A continuous line arrow L11 represents the moving locus of the central portion of the front end of the vehicle 10.

In the example shown in FIG. 3, the vehicle 10 advances (travels straight), and the vehicle 71 is stopped. Therefore, the relative longitudinal speed Vx(1) is a negative value, the magnitude of the relative longitudinal speed Vx(1) is equal to the vehicle speed Vs, and the relative lateral speed Vy(1) is zero.

The length Dy1 is smaller than a half of the width Wo of the vehicle 10 (namely, |Dy(1)|<Wo/2). In addition, since the vehicle 10 travels straight and the vehicle 71 is stopped, the approach lateral distance Dyr(1) is equal to Dy1 (namely, the magnitude of the lateral distance Dy(1) does not change from the length Dy1). Accordingly, the relation of equation (1) holds. Therefore, the driving assist ECU 20 determines that the vehicle 71 is an obstacle.

Once the obstacle is specified, the driving assist ECU 20 calculates a collision time TTC, which is a time expected to elapse until the vehicle 10 collides with the obstacle (a) on the basis of the longitudinal distance Dx(a) and the relative longitudinal speed Vx(a) of the obstacle (a). Specifically, the collision time TTC is obtained by reversing the sign of a value obtained by dividing the longitudinal distance Dx(a) by the relative longitudinal speed Vx(a) (namely, TTC=−Dx(a)/Vx(a)).

In the example shown in FIG. 3, the collision time TTC is equal to a value obtained by dividing the length Dx1 by the vehicle speed Vs (namely, TTC=Dx1/Vs).

If the collision time TTC is less than a predetermined first time threshold Tth1 (specifically, the collision time TTC is a positive value and the magnitude of the collision time TTC is less than the first time threshold Tth1), the driving assist ECU 20 determines that the obstacle associated with the collision time TTC is a collision obstacle (obstacle which is highly likely to collide with the vehicle 10). The first time threshold Tth1 is set to a time determined such that in the case where the collision time TTC is less than the first time threshold Tth1, even when the driver having become aware of the obstacle performs an ordinary braking operation, the driver cannot stop the vehicle 10 at a position before the obstacle.

In the case where a collision obstacle is present and a process execution condition to be described later is satisfied, the driving assist ECU 20 executes a collision avoidance process. The collision avoidance process includes a warning process of proving a warning to the driver of the vehicle 10 and an automatic braking process of causing the brake actuator 66 to generate the braking force Bf. At the time of execution of the warning process, the driving assist ECU 20 causes the input output device 46 to display "a symbol representing that a collision obstacle is present" and causes the speakers 47 to reproduce a warning sound.

The automatic braking process will be described. At the time of execution of the automatic braking process, the driving assist ECU 20 determines a target deceleration Dctgt. More specifically, a required deceleration Dcreq, which is an acceleration As necessary for stopping the vehicle 10 after traveling over a travel distance Dd, is calculated in accordance with the following equation (2).

$$Dcreq = -(1/2) \cdot Vs^2 / Dd \quad (2)$$

The driving assist ECU 20 computes the required deceleration Dcreq by substituting the difference between the longitudinal distance Dx(a) of the obstacle (a) and a predetermined length (stop position margin) Lv into equation (2) as a travel distance Dd (namely, Dd=Dx(a)−Lv).

In the case where the magnitude |Dcreq| of the required deceleration Dcreq is greater than the magnitude |Dcmax| of a maximum deceleration Dcmax which is the maximum value of deceleration of the vehicle 10, the driving assist ECU 20 sets the value of the target deceleration Dctgt to the maximum deceleration Dcmax. Meanwhile, in the case where the magnitude |Dcreq| of the required deceleration Dcreq is equal to or less than the magnitude |Dcmax| of the maximum deceleration Dcmax, the driving assist ECU 20 sets the value of the target deceleration Dctgt to the required deceleration Dcreq. The maximum deceleration Dcmax is set such that slippage does not occur between the wheels (not shown) of the vehicle 10 and a road surface as a result of generation of the braking force Bf for decreasing the vehicle speed Vs.

The driving assist ECU 20 sends request signals to the engine ECU 31 and the brake ECU 32 such that the actual acceleration As becomes equal to the target deceleration Dctgt. Specifically, the driving assist ECU 20 sends a request signal to the brake ECU 32 so as to request it to generate the braking force Bf such that the actual acceleration As becomes equal to the target deceleration Dctgt. In addition, the driving assist ECU 20 sends a request signal to the engine ECU 31 so as to request it to decrease the drive torque Tq to zero. As a result, the vehicle speed Vs decreases, and finally becomes zero.

(Process Execution Condition in Collision Avoidance Process)

Next, the above-mentioned process execution condition will be described. In some cases, the driver of the vehicle 10 is trying to avoid the collision with the collision obstacle by operating the steering wheel 51. In such a case, in order to place priority on the collision avoidance operation by the driver, the collision avoidance process should not be executed. In view of this, the driving assist ECU 20 executes the collision avoidance process only upon satisfaction of the process execution condition which is satisfied when the driver is not trying to avoid the collision with the collision obstacle by operating the steering wheel 51.

In principle, the process execution condition is a condition which is satisfied upon satisfaction of both the following conditions (A1) and (B1).

Condition (A1): The steering angle θs is smaller than a first angle θth1 which is a predetermined positive angle (namely, θs<θth1).

Condition (B1): The steering angle θs is larger than an angle (−θth2) obtained by multiplying a second angle θth2 which is a predetermined positive angle by "−1" (namely, −θth2<θs).

In the present embodiment, both the first angle θth1 and the second angle θth2 are 50°. The rotational position of the steering wheel 51 when the steering angle θs is the first angle θth1 will also be referred to as "a clockwise direction reference position" for convenience' sake. Meanwhile, the rotational position of the steering wheel 51 when the steering angle θs is the angle obtained by multiplying the second angle θth2 by "−1" will also be referred to as "a counterclockwise direction reference position" for convenience' sake.

In the example of FIG. 3, when the driver operates the steering wheel 51 such that the travel path of the vehicle 10 coincides with a broken line arrow L12, the state of the vehicle 10 changes from a state in which the steering angle θs is "0" to a state in which the steering angle θs is larger than the first angle θth1, and then returns to the state in which the steering angle θs is "0."

As a result, there is produced a period during which the condition (A1) is not satisfied. In this case, even when the driving assist ECU 20 has already started the collision avoidance process, the driving assist ECU 20 ends the collision avoidance process when the condition (A1) becomes unsatisfied.

(Case of Right Turn)

Incidentally, when the driver of the vehicle 10 operates the steering wheel 51 so as to make a right turn, the above-described condition (A1) may becomes unsatisfied in some cases. Even in such a case, execution of the collision avoidance process is proper if an collision obstacle is detected and the driver is not trying to avoid collision with the collision obstacle by operating the steering wheel 51.

In view of the foregoing, in the case where the vehicle 10 is making a right turn, the driving assist ECU 20 determines that the process execution condition is satisfied if the following condition (A2), rather than the above-mentioned condition (A1), is satisfied (namely, both the condition (A2) and the above-mentioned condition (B1) are satisfied).

Condition (A2): The steering angle θs is smaller than a predetermined third angle θth3 larger than the first angle θth1 (namely, θth1<θth3, θs<θth3).

In the present embodiment, the third angle θth3 is 360°. In the case where the condition (A2) and the condition (B1) are employed as the process execution condition, it can be considered that the above-mentioned clockwise direction reference position is changed from "the rotational position of the steering wheel 51 represented by the first angle θth1" to "the rotational position of the steering wheel 51 represented by the third angle θth3." The process of employing the condition (A2) instead of the condition (A1) as a necessary condition of the process execution condition will also be referred to as "a clockwise adjustment process" for convenience' sake.

The driving assist ECU 20 determines that the vehicle 10 is making a right turn if the time of continuation of "a state in which the steering angle θs is larger than a predetermined positive clockwise angle threshold θRth" to the present point in time is longer than a predetermined second time threshold Tth2. The clockwise angle threshold θRth is set to become equal to the smallest value of a general range of the steering angle θs for the case where the vehicle 10 makes a right turn at an intersection (specifically, for the case where the steering wheel 51 is operated in the clockwise direction and the steering angle θs is maintained approximately constant).

The second time threshold Tth2 is set to be longer than the length of a general period during which the steering angle θs becomes large for avoidance of "a stopped vehicle in the heading direction of the vehicle 10" such as a vehicle 71 shown in FIG. 3 and be shorter than the length of a general period during which the steering angle θs becomes large due to a left or right turn of the vehicle 10. The second time threshold Tth2 which is referred to for the determination as to whether or not the vehicle 10 is making a right turn will also be referred to as "a clockwise continuation time" for convenience' sake.

Figure 4:
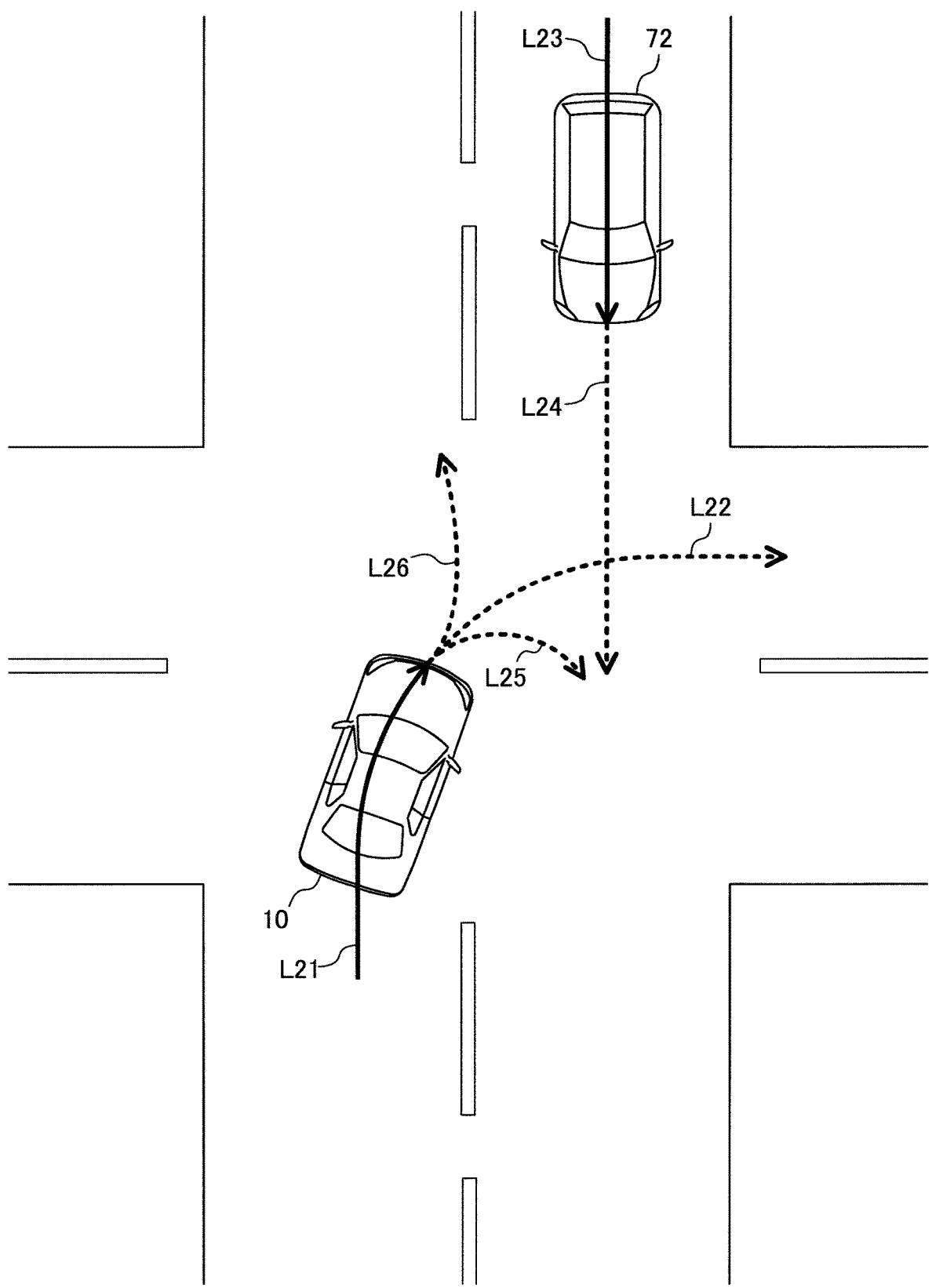
FIG. 4 is an illustration showing the present vehicle making a right turn at an intersection and another vehicle which is highly likely to collide with the present vehicle.

FIG. 4 is a plan view showing a state in which the vehicle 10 is making a right turn at an intersection. A continuous line arrow L21 of FIG. 4 represents the traveling path of the vehicle 10 (the moving locus of the center of the front end of the vehicle 10). A broken line arrow L22 represents a future travel path of the vehicle 10 which the driver intends.

A vehicle 72 shown in FIG. 4 travels in a lane opposite the lane in which the vehicle 10 travels. Namely, the vehicle 72 is an oncoming vehicle.

A continuous line arrow L23 represents the travel path of the vehicle 72 (the moving locus of the center of the front end of the vehicle 72). A broken line arrow L24 represents a future travel path of the vehicle 72 under the assumption that the speed and heading direction of the vehicle 72 do not change. At the point in time shown in FIG. 4, the driving assist ECU 20 determines that the vehicle 72 is a collision obstacle. In other words, before the point in time shown in FIG. 4, the driving assist ECU 20 has not yet determined that the vehicle 72 is a collision obstacle.

The time of continuation of the state in which the steering angle θs is larger than the clockwise angle threshold θRth to the point in time shown in FIG. 4 is longer than the second time threshold Tth2. Therefore, the driving assist ECU 20 has determined that the vehicle 10 is making a right turn. In addition, the steering angle θs is larger than the first angle θth1 and smaller than the third angle θth3 (namely, θth1<θs<θth3). Therefore, although the condition (A1) is not satisfied, the condition (A2) is satisfied. Further, since the steering angle θs assumes a positive value at this point in time, the condition (B1) is satisfied. Accordingly, at the point in time shown in FIG. 4, the driving assist ECU 20 starts the collision avoidance process.

After that, in order to avoid collision with the vehicle 72, the driver may operate the steering wheel 51 such that the vehicle 10 travels along a path represented by a broken line arrow L25. As a result, the steering angle θs becomes larger than the third angle θth3. In this case, the condition (A2) becomes unsatisfied, and consequently, the driving assist ECU 20 ends the collision avoidance process.

Alternatively, in order to avoid collision with the vehicle 72, the driver may operate the steering wheel 51 such that the vehicle 10 travels along a path represented by a broken line arrow L26. As a result, the steering angle θs becomes smaller than the angle obtained by multiplying the second angle θth2 by "−1." In this case, the condition (B1) becomes unsatisfied, and consequently, the driving assist ECU 20 ends the collision avoidance process.

(Case of Left Turn)

Next, the case where the vehicle 10 makes a left turn will be described. When the driver of the vehicle 10 operates the steering wheel 51 so as to make a left turn, the above-described condition (B1) may become unsatisfied in some cases. Even in such a case, execution of the collision avoidance process is proper if a collision obstacle is detected and the driver is not trying to avoid collision with the collision obstacle by operating the steering wheel 51.

In view of the foregoing, in the case where the vehicle 10 is making a left turn, the driving assist ECU 20 determines that the process execution condition is satisfied if the following condition (B2), rather than the above-mentioned condition (B1), is satisfied (namely, both the above-mentioned condition (A1) and the condition (B2) are satisfied).

Condition (B2): The steering angle θs is larger than an angle (−θth4) obtained by multiplying a predetermined fourth angle θth4 by "−1," the fourth angle θth4 being larger than the second angle θth2 (namely, θth2<θth4, −θth4<θs).

In the present embodiment, the fourth angle θth4 is 360°. In the case where the condition (A1) and the condition (B2) are employed as the process execution condition, it can be considered that the above-mentioned counterclockwise direction reference position is changed from "the rotational position of the steering wheel 51 represented by the angle (−θth2) obtained by multiplying the second angle θth2 by "−1"" to "the rotational position of the steering wheel 51 represented by the angle (−θth4) obtained by multiplying the fourth angle θth4 by "−1."" The process of employing the condition (B2) instead of the condition (B1) as a necessary condition of the process execution condition will also be referred to as "a counterclockwise adjustment process" for convenience' sake.

The driving assist ECU 20 determines that the vehicle 10 is making a left turn if the time of continuation of "a state in which the steering angle θs is larger than a predetermined negative counterclockwise angle threshold θLth" to the present point in time is longer than a predetermined second time threshold Tth2. The magnitude |θLth| of the counterclockwise angle threshold θLth is set to become equal to the smallest value of a general range of the steering angle θs for the case where the vehicle 10 makes a left turn at an intersection (specifically, for the case where the steering wheel 51 is operated in the counterclockwise direction and the steering angle θs is maintained approximately constant). The second time threshold Tth2 which is referred to for the determination as to whether or not the vehicle 10 is making a left turn will also be referred to as "a counterclockwise continuation time" for convenience' sake.

Figure 5:
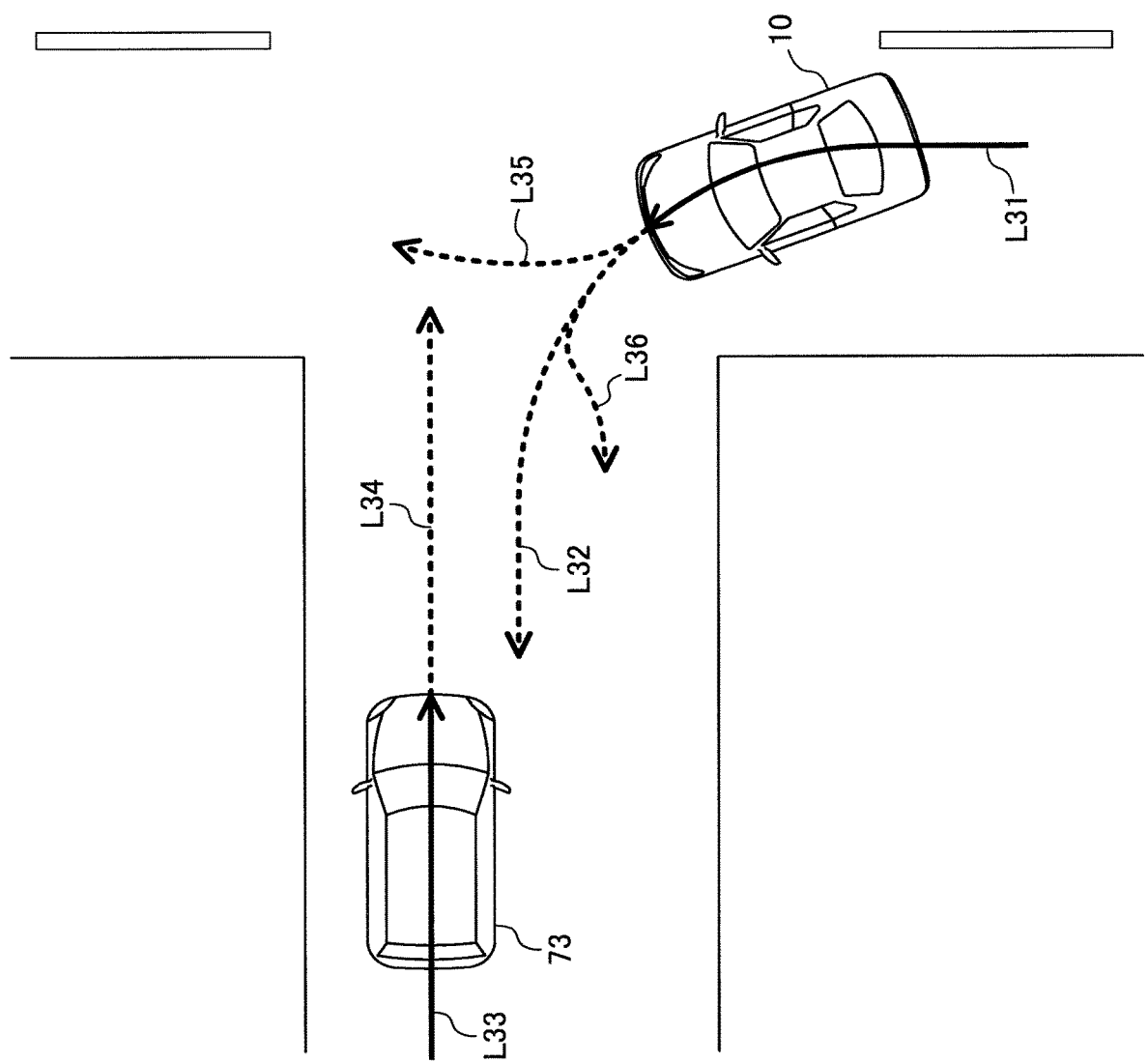
FIG. 5 is an illustration showing the present vehicle making a left turn at an intersection and another vehicle which is highly likely to collide with the present vehicle.

FIG. 5 is a plan view showing a state in which the vehicle 10 is making a left turn at an intersection. A continuous line arrow L31 of FIG. 5 represents the traveling path of the vehicle 10 (the moving locus of the center of the front end of the vehicle 10). A broken line arrow L32 represents a future travel path of the vehicle 10 which the driver intends. As can be understood from the continuous line arrow L31 and the broken line arrow L32, the driver attempts to cause the vehicle 10 to travel near the center of a road which the vehicle 10 enters as a result of the left turn at the intersection.

A vehicle 73 shown in FIG. 5 is traveling in the road which the vehicle 10 will enter, in a direction opposite the traveling direction of the vehicle 10 in that road. A continuous line arrow L33 represents the travel path of the vehicle 73 (the moving locus of the center of the front end of the vehicle 73). A broken line arrow L34 represents a future travel path of the vehicle 73 under the assumption that the speed and heading direction of the vehicle 73 do not change.

At the point in time shown in FIG. 5, the driving assist ECU 20 determines that the vehicle 73 is a collision obstacle. In other words, before the point in time shown in FIG. 5, the driving assist ECU 20 has not yet determined that the vehicle 73 is a collision obstacle.

The time of continuation of the state in which the steering angle θs is smaller than the counterclockwise angle threshold θLth to the point in time shown in FIG. 5 is longer than the second time threshold Tth2. Therefore, the driving assist ECU 20 has determined that the vehicle 10 is making a left turn. In addition, the steering angle θs is smaller than the angle (−θth2) obtained by multiplying the second angle θth2 by "−1" and larger than the angle (−θth4) obtained by multiplying the fourth angle θth4 by "−1" (namely, −θth4<θs<−θth2). Therefore, although the condition (B1) is not satisfied, the condition (B2) is satisfied. Further, since the steering angle θs assumes a negative value at this point in time, the condition (A1) is satisfied. Accordingly, at the point in time shown in FIG. 5, the driving assist ECU 20 starts the collision avoidance process.

After that, in order to avoid collision with the vehicle 73, the driver may operate the steering wheel 51 such that the vehicle 10 travels along a path represented by a broken line arrow L35. As a result, the steering angle θs becomes larger than the first angle θth1. In this case, the condition (A1) becomes unsatisfied, and consequently, the driving assist ECU 20 ends the collision avoidance process.

Alternatively, in order to avoid collision with the vehicle 73, the driver may operate the steering wheel 51 such that the vehicle 10 travels along a path represented by a broken line arrow L36. As a result, the steering angle θs becomes smaller than the angle obtained by multiplying the fourth angle θth4 by "−1." In this case, the condition (B2) becomes unsatisfied, and consequently, the driving assist ECU 20 ends the collision avoidance process.

(Specific Operation—Right/Left Turn Flag Setting Routine)

Next, specific operation of the driving assist ECU 20 will be described. The CPU of the driving assist ECU 20 (hereinafter also referred to as "the CPU" for simplification) executes "a right/left turn flag setting routine," "a collision avoidance process start routine," and "a collision avoidance process end routine" every time a predetermined time elapses.

First, the right/left turn flag setting routine will be described. In the present routine, the value of a right turn flag XR and the value of a left turn flag XL are set. More specifically, the right turn flag XR is set to "0" when the steering angle θs is equal to or smaller than the clockwise angle threshold θRth. Meanwhile, the right turn flag XR is set to "1" when the steering angle θs is larger than the clockwise angle threshold θRth. The left turn flag XL is set to "0" when the steering angle θs is equal to or larger than the counterclockwise angle threshold θLth. Meanwhile, the left turn flag XL is set to "1" when the steering angle θs is smaller than the counterclockwise angle threshold θLth.

Each of the right turn flag XR and the left turn flag XL is set to "0" in an initial routine (not shown) which is executed by the CPU when the driving assist ECU 20 is started (namely, when an illustrated ignition key switch of the vehicle 10 is moved from an OFF position to an ON position).

Figure 6:
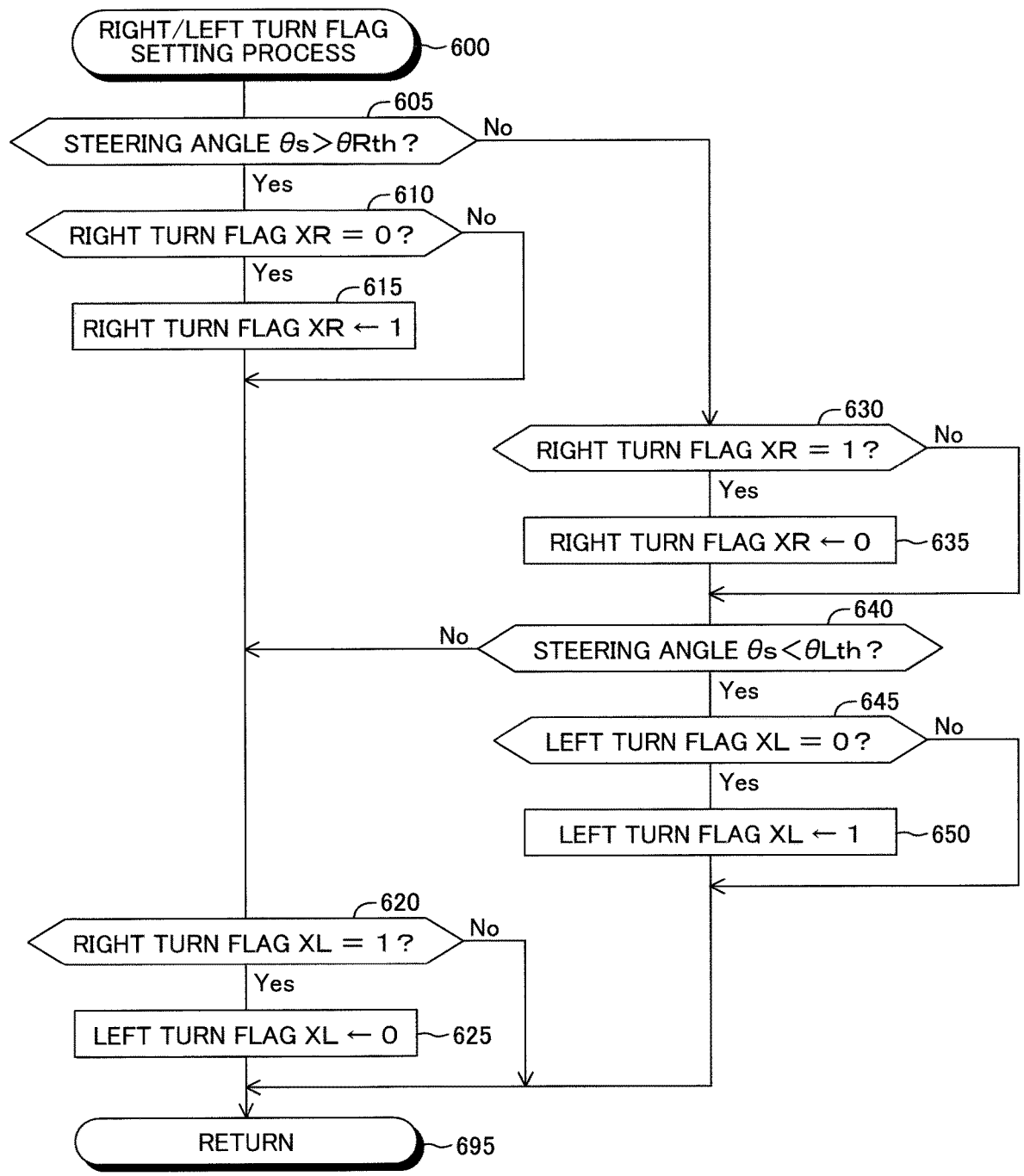
FIG. 6 is a flowchart representing a right/left turn flag setting routine executed by the present assist apparatus.

The right/left turn flag setting routine is represented by a flowchart in FIG. 6. When a proper timing has come, the CPU starts the process from step 600 of FIG. 6 and proceeds to step 605 so as to determine whether or not the steering angle θs is larger than the clockwise angle threshold θRth.

In the case where the steering angle θs is larger than the clockwise angle threshold θRth, the CPU makes a "Yes" determination in step 605 and proceeds to step 610 so as to determine whether or not the value of the right turn flag XR is "0." In the case where the value of the right turn flag XR is "0," the CPU makes a "Yes" determination in step 610 and proceeds to step 615 so as to set the value of the right turn flag XR to "1." Subsequently, the CPU proceeds to step 620. Meanwhile, in the case where the value of the right turn flag XR is "1," the CPU makes a "No" determination in step 610 and proceeds directly to step 620.

In step 620, the CPU determines whether or not the value of the left turn flag XL is "1." In the case where the value of the left turn flag XL is "1," the CPU makes a "Yes" determination in step 620 and proceeds to step 625. In step 625, the CPU sets the value of the left turn flag XL to "0." Subsequently, the CPU proceeds to step 695 and ends the present routine. Meanwhile, in the case where the value of the left turn flag XL is "0," the CPU makes a "No" determination in step 620 and proceeds directly to step 695.

In the case where the determination condition of step 605 is not satisfied (namely, the steering angle θs is equal to or smaller than the clockwise angle threshold θRth), the CPU makes a "No" determination in step 605 and proceeds to step 630 so as to determine whether or not the value of the right turn flag XR is "1."

In the case where the value of the right turn flag XR is "1," the CPU makes a "Yes" determination in step 630 and proceeds to step 635 so as to set the value of the right turn flag XR to "0." Subsequently, the CPU proceeds to step 640. Meanwhile, in the case where the value of the right turn flag XR is "0," the CPU makes a "No" determination in step 630 and proceeds directly to step 640.

In step 640, the CPU determines whether or not the steering angle θs is smaller than the counterclockwise angle threshold θLth. In the case where the steering angle θs is smaller than the counterclockwise angle threshold θLth, the CPU makes a "Yes" determination in step 640 and proceeds to step 645 so as to determine whether or not the value of the left turn flag XL is "0."

In the case where the value of the left turn flag XL is "0," the CPU makes a "Yes" determination in step 645 and proceeds to step 650 so as to set the value of the left turn flag XL to "1." Subsequently, the CPU proceeds to step 695. Meanwhile, in the case where the value of the left turn flag XL is "1," the CPU makes a "No" determination in step 645 and proceeds directly to step 695.

In the case where the determination condition of step 640 is not satisfied (namely, the steering angle θs is equal to or larger than the counterclockwise angle threshold θLth), the CPU makes a "No" determination in step 640 and proceeds to step 620.

(Specific Operation—Collision Avoidance Process Start Routine)

Figure 7:
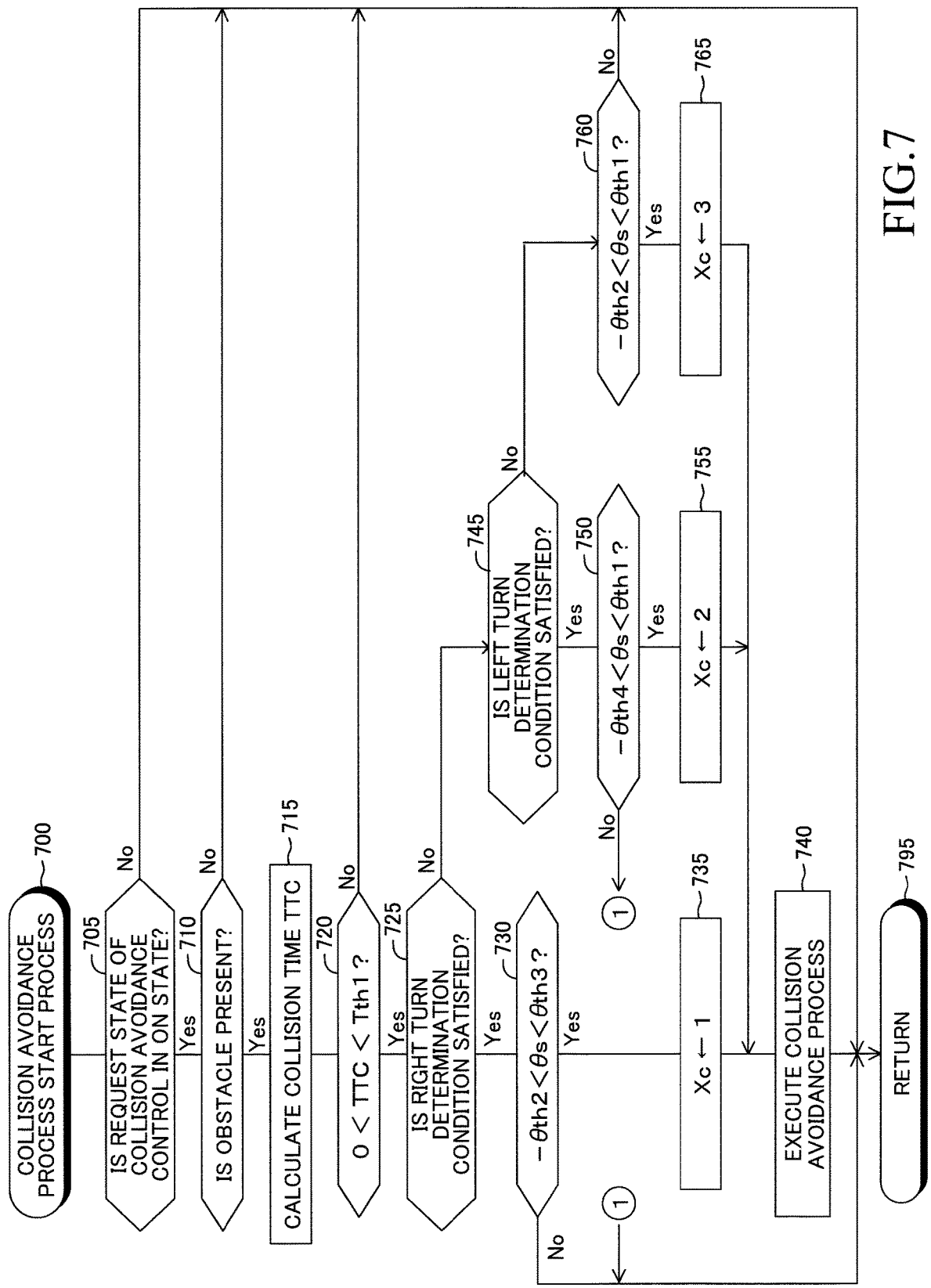
FIG. 7 is a flowchart representing a collision avoidance process start routine executed by the present assist apparatus.

Next, the collision avoidance process start routine will be described. The collision avoidance process start routine is represented by a flowchart in FIG. 7. When a proper timing has come, the CPU starts the process from step 700 of FIG. 7 and proceeds to step 705 so as to determine whether or not the request state of the collision avoidance process is in the ON state.

In the case where the request state of the collision avoidance process has been set to the OFF state as a result of the operation of the input output apparatus 46 by the driver, the CPU makes a "No" determination in step 705 and proceeds directly to step 795 so as to end the present routine.

Meanwhile, in the case where the request state of the collision avoidance process has been set to the ON state, the CPU makes a "Yes" determination in step 705 and proceeds to step 710 so as to determine whether or not there exists a target determined to be an obstacle.

In the case where there exists a target determined to be an obstacle, the CPU makes a "Yes" determination in step 710 and proceeds to step 715 so as to calculate the collision time TTC. Subsequently, the CPU proceeds to step 720 so as to determine whether or not the collision time TTC assumes a positive value and is smaller than the first time threshold Tth1. Namely, the CPU determines whether or not "the target determined to be an obstacle" is a collision obstacle.

In the case where the collision time TTC assumes a positive value and is smaller than the first time threshold Tth1, the CPU makes a "Yes" determination in step 720 and proceeds to step 725 so as to determine whether or not a right turn determination condition is satisfied. The right turn determination condition is a condition for determining whether or not the vehicle 10 is making a right turn. The right turn determination condition is a condition which is satisfied when the following condition (TR) is satisfied.

Condition (TR): The time of continuation of a state in which the right turn flag XR is "1" to the present point in time is longer than the second time threshold Tth2. Namely, the value of the right turn flag XR was changed from "0" to "1" at a point in time which precedes the present point in time by the second time threshold Tth2, and the state in which the right turn flag XR is "1" continues to the present point in time.

In the case where the right turn determination condition is satisfied, the CPU makes a "Yes" determination in step 725 and proceeds to step 730 so as to determine whether or not the steering angle θs is larger than a value obtained by multiplying the second angle θth2 by "−1" and is smaller than the third angle θth3. Namely, the CPU determines whether or not the process execution condition for the case where the vehicle 10 is making a right turn (in this case, a condition which is satisfied upon satisfaction of both the above-mentioned conditions (A2) and (B1)) is satisfied.

In the case where the steering angle θs is larger than the value obtained by multiplying the second angle θth2 by "−1" and is smaller than the third angle θth3, the CPU makes a "Yes" determination in step 730 and proceeds to step 735 so as to set the value of the collision avoidance flag Xc to "1."

The value of the collision avoidance flag Xc is set to "0" by the above-mentioned initial routine. The collision avoidance flag Xc is set to a value other than "0" when the collision avoidance process is being executed. More specifically, in the case where the collision avoidance process is executed when the vehicle 10 is making a right turn, the collision avoidance flag Xc is set to "1." In the case where the collision avoidance process is executed when the vehicle 10 is making a left turn, the collision avoidance flag Xc is set to "2" (see step 755 to be described later). In the case where the collision avoidance process is executed when the vehicle 10 is not making a right turn or a left turn, the collision avoidance flag Xc is set to "3" (see step 765 to be described later).

Subsequently, the CPU proceeds to step 740 so as to execute the collision avoidance process. More specifically, the CPU causes the input output apparatus 46 to display "a symbol representing the presence of a collision obstacle" and causes the speakers 47 to reproduce a warning sound. In addition, the CPU sends the target deceleration Dctgt determined by the above-described process to the brake ECU 32 through the CAN 34. As a result, the brake ECU 32 controls the brake actuator 66 by executing an unillustrated routine such that the actual acceleration As becomes equal to the target deceleration Dctgt, whereby the required braking force Bf is generated.

Further, the CPU sets the value of a target drive torque Tqtgt to "0" and sends the target drive torque Tqtgt to the engine ECU 31 through the CAN 34. As a result, the engine ECU 31 controls the engine actuators 63 and the transmission 64 by executing an unillustrated routine such that the actual drive torque Tq becomes equal to the target drive torque Tqtgt. After that, the CPU proceeds to step 795.

Meanwhile, in the case where the determination condition of step 725 is not satisfied (namely, the right turn determination condition is not satisfied; specifically, the condition (TR) is not satisfied), the CPU makes a "No" determination in step 725 and proceeds to step 745.

In step 745, the CPU determines whether or not a left turn determination condition is satisfied. The left turn determination condition is a condition for determining whether or not the vehicle 10 is making a left turn. The left turn determination condition is a condition which is satisfied when the following condition (TL) is satisfied.

Condition (TL): The time of continuation of a state in which the left turn flag XL is "1" to the present point in time is longer than the second time threshold Tth2. Namely, the value of the left turn flag XL was changed from "0" to "1" at a point in time which precedes the present point in time by the second time threshold Tth2, and the state in which the left turn flag XL is "1" continues to the present point in time.

In the case where the left turn determination condition is satisfied, the CPU makes a "Yes" determination in step 745 and proceeds to step 750 so as to determine whether or not the steering angle θs is larger than a value obtained by multiplying the fourth angle θth4 by "−1" and is smaller than the first angle θth1. Namely, the CPU determines whether or not the process execution condition for the case where the vehicle 10 is making a left turn (in this case, a condition which is satisfied upon satisfaction of both the above-mentioned conditions (A1) and (B2)) is satisfied.

In the case where the steering angle θs is larger than the value obtained by multiplying the fourth angle θth4 by "−1" and is smaller than the first angle θth1, the CPU makes a "Yes" determination in step 750 and proceeds to step 755 so as to set the value of the collision avoidance flag Xc to "2." Subsequently, the CPU proceeds to step 740.

Meanwhile, in the case where the determination condition of step 745 is not satisfied (namely, the left turn determination condition is not satisfied; specifically, the condition (TL) is not satisfied), the CPU makes a "No" determination in step 745 and proceeds to step 760.

In step 760, the CPU determines whether or not the steering angle θs is larger than a value obtained by multiplying the second angle θth2 by "−1" and is smaller than the first angle θth1. Namely, the CPU determines whether or not the process execution condition for the case where the vehicle 10 is making neither a right turn nor a left turn (in this case, a condition which is satisfied upon satisfaction of both the above-mentioned conditions (A1) and (B1)) is satisfied.

In the case where the steering angle θs is larger than the value obtained by multiplying the second angle θth2 by "−1" and is smaller than the first angle θth1, the CPU makes a "Yes" determination in step 760 and proceeds to step 765 so as to set the value of the collision avoidance flag Xc to "3." Subsequently, the CPU proceeds to step 740.

Notably, in the case where the determination condition of step 730 is not satisfied (namely, the steering angle θs is equal to or smaller than the value obtained by multiplying the second angle θth2 by "−1" or is equal to or larger than the third angle θth3), the CPU makes a "No" determination in step 730 and proceeds directly to step 795. In addition, in the case where the determination condition of step 750 is not satisfied (namely, the steering angle θs is equal to or smaller than the value obtained by multiplying the fourth angle θth4 by "−1" or is equal to or larger than the first angle θth1), the CPU makes a "No" determination in step 750 and proceeds directly to step 795. Further, in the case where the determination condition of step 760 is not satisfied (namely, the steering angle θs is equal to or smaller than the value obtained by multiplying the second angle θth2 by "−1" or is equal to or larger than the first angle θth1), the CPU makes a "No" determination in step 760 and proceeds directly to step 795.

In addition, in the case where the determination condition of step 710 is not satisfied (namely, no target is determined to be an obstacle), the CPU makes a "No" determination in step 710 and proceeds directly to step 795. Further, in the case where the determination condition of step 720 is not satisfied (namely, the collision time TTC is equal to or greater than the first time threshold Tth1 or the collision time TTC assumes a negative value), the CPU makes a "No" determination in step 720 and proceeds directly to step 795.

(Specific Operation—Collision Avoidance Process End Routine)

Next, the collision avoidance process end routine will be described. In the present routine, the CPU ends the collision avoidance process when the collision avoidance process is being executed and the driver is trying to avoid collision with the collision obstacle by operating the steering wheel 51 (namely, the process execution condition becomes unsatisfied). In addition, the CPU ends the collision avoidance process when the collision avoidance process is being executed and a collision avoidance process end condition to be described later is satisfied.

Figure 8:
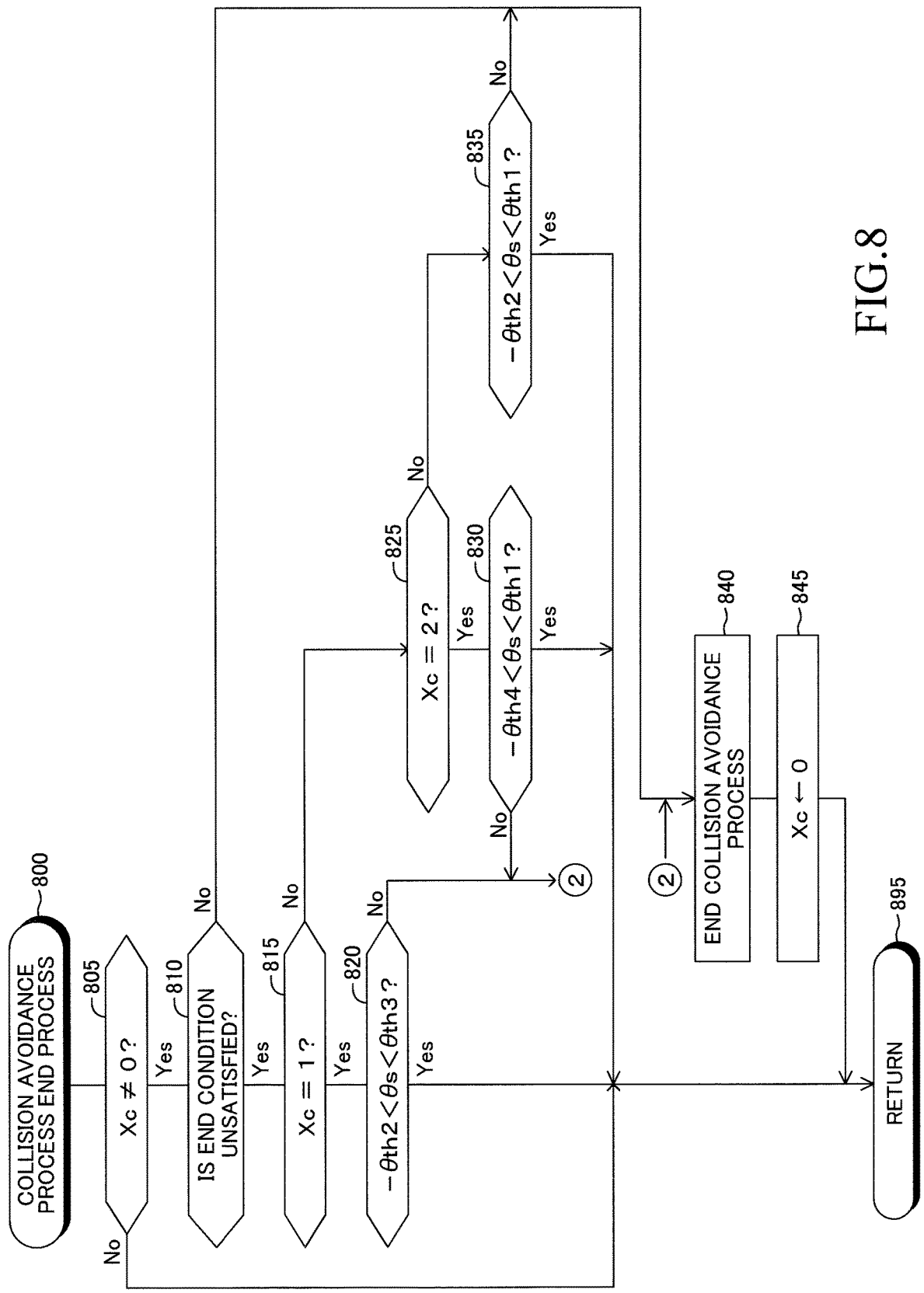
FIG. 8 is a flowchart representing a collision avoidance process end routine executed by the present assist apparatus.

The collision avoidance process end routine is represented by a flowchart in FIG. 8. When a proper timing has come, the CPU starts the process from step 800 of FIG. 8 and proceeds to step 805 so as to determine whether or not the value of the collision avoidance flag Xc is other than "0." Namely, the CPU determines whether or not the collision avoidance process is being executed.

In the case where the value of the collision avoidance flag Xc is "0" (namely, the collision avoidance process is not being executed), the CPU makes a "No" determination in step 805 and proceeds directly to step 895 so as to end the present routine. Meanwhile, in the case where the value of the collision avoidance flag Xc is other than "0," the CPU makes a "Yes" determination in step 805 and proceeds to step 810 so as to determine whether or not the collision avoidance process end condition is unsatisfied.

The collision avoidance process end condition is a condition which is satisfied upon satisfaction of at least one of the following conditions (E1) and (E2).

Condition (E1): A predetermined time has elapsed after the vehicle speed Vs had become "0" to the present point in time.

Condition (E2): A collision obstacle (namely, a target which has been determined to be highly likely to collide with the vehicle 10) has disappeared.

In the case where the collision avoidance process end condition is satisfied, the CPU makes a "No" determination in step 810 and proceeds to step 840 so as to end the collision avoidance process. More specifically, the CPU sends a request of cancelling "the already sent target deceleration Dctgt" to the brake ECU 32 through the CAN 34. In this case, by executing an unillustrated routine, the brake ECU 32 starts a process of determining the braking force Bf generated by the brake actuator 66 on the basis of the detection signals received from the brake sensors 65.

In addition, the CPU sends a request of cancelling "the already sent target drive torque Tqtgt" to the engine ECU 31 through the CAN 34. In this case, by executing an unillustrated routine, the engine ECU 31 starts a process of determining the drive torque Tq generated by the engine actuator 62 and the gear ratio Rg of the transmission 64 on the basis of the detection signals received from the engine sensors 61.

Subsequently, the CPU proceeds to step 845 so as to set the value of the collision avoidance flag Xc to "0." Further, the CPU proceeds to step 895.

Meanwhile, the determination condition of step 810 is satisfied (namely, the collision avoidance process end condition is unsatisfied), the CPU makes a "Yes" determination in step 810 and proceeds to step 815 so as to determine whether or not the value of the collision avoidance flag Xc is "1."

In the case where the value of the collision avoidance flag Xc is "1," the CPU makes a "Yes" determination in step 815 and proceeds to step 820 so as to determine whether or not the steering angle θs is larger than the value obtained by multiplying the second angle θth2 by "−1" and is smaller than the third angle θth3. Namely, the CPU determines whether or not the process execution condition for the case where the vehicle 10 is making a right turn (in this case, a condition which is satisfied upon satisfaction of both the above-mentioned conditions (A2) and (B1)) is satisfied.

In the case where the steering angle θs is larger than the value obtained by multiplying the second angle θth2 by "−1" and is smaller than the third angle θth3, the CPU makes a "Yes" determination in step 820 and proceeds directly to step 895. Accordingly, in this case, the collision avoidance process is continued.

Meanwhile, in the case where the value of the collision avoidance flag Xc is not "1," the CPU makes a "No" determination in step 815 and proceeds to step 825 so as to determine whether or not the value of the collision avoidance flag Xc is "2."

In the case where the value of the collision avoidance flag Xc is "2," the CPU makes a "Yes" determination in step 825 and proceeds to step 830 so as to determine whether or not the steering angle θs is larger than the value obtained by multiplying the fourth angle θth4 by "−1" and is smaller than the first angle θth1. Namely, the CPU determines whether or not the process execution condition for the case where the vehicle 10 is making a left turn (in this case, a condition which is satisfied upon satisfaction of both the above-mentioned conditions (A1) and (B2)) is satisfied.

In the case where the steering angle θs is larger than the value obtained by multiplying the fourth angle θth4 by "−1" and is smaller than the first angle θth1, the CPU makes a "Yes" determination in step 830 and proceeds directly to step 895. Accordingly, in this case, the collision avoidance process is continued.

Meanwhile, in the case where the value of the collision avoidance flag Xc is not "2," the CPU makes a "No" determination in step 825 and proceeds to step 835 so as to determine whether or not the steering angle θs is larger than the value obtained by multiplying the second angle θth2 by "−1" and is smaller than the first angle θth1. Namely, the CPU determines whether or not the process execution condition for the case where the vehicle 10 is making none of a right turn and a left turn (in this case, a condition which is satisfied upon satisfaction of both the above-mentioned conditions (A1) and (B1)) is satisfied.

In the case where the steering angle θs is larger than the value obtained by multiplying the second angle θth2 by "−1" and is smaller than the first angle θth1, the CPU makes a "Yes" determination in step 835 and proceeds directly to step 895. Accordingly, in this case, the collision avoidance process is continued.

In the case where the determination condition of step 820 is not satisfied (namely, the steering angle θs is equal to or smaller than the value obtained by multiplying the second angle θth2 by "−1" or is equal to or larger than the third angle θth3), the CPU makes a "No" determination in step 820 and proceeds to step 840. In addition, in the case where the determination condition of step 830 is not satisfied (namely, the steering angle θs is equal to or smaller than the value obtained by multiplying the fourth angle θth4 by "−1" or is equal to or larger than the first angle θth1), the CPU makes a "No" determination in step 830 and proceeds to step 840.

Further, in the case where the determination condition of step 835 is not satisfied (namely, the steering angle θs is equal to or smaller than the value obtained by multiplying the second angle θth2 by "−1" or is equal to or larger than the first angle θth1), the CPU makes a "No" determination in step 835 and proceeds to step 840. In these cases (namely, the case where a "No" determination is made in any of step 820, step 830, and step 835), the CPU determines that the driver is trying to avoid collision with the collision obstacle by operating the steering wheel 51, and ends the collision avoidance process.

As having been described above, in the case where the process execution condition is not satisfied when a collision obstacle is detected, the present assist apparatus determines that the driver of the vehicle 10 is trying to avoid collision with the collision obstacle by operating the steering wheel 51 and does not execute the collision avoidance process. In addition, the present assist apparatus changes the process execution condition in accordance with the driving state of the vehicle 10 (specifically, one of the state in which the vehicle is making a right turn, the state in which the vehicle is making a left turn, and the state in which the vehicle is making none of a right turn and a left turn). Therefore, even when the vehicle 10 is making a right turn or a left turn, the present assist apparatus can properly determine, on the basis of the steering wheel operation by the driver, whether to execute the collision avoidance process when the possibility of collision of the vehicle 10 with an obstacle is high. In addition, the present assist apparatus can accurately determine whether the vehicle 10 is making a right run or a left turn on the basis of the conditions (TR) and (TL).

The embodiment of the driving assist apparatus according to the present invention has been described; however, the present invention is not limited to the above-described embodiment, and various modifications are possible without departing from the scope of the invention. For example, the vehicle 10 according to the present embodiment has the millimeter wave radar 41 and the front camera 42 for obtaining the target information. However, one of the millimeter wave radar 41 and the front camera 42 may be omitted. Further, instead of or in addition to the millimeter wave radar 41 and the front camera 42, the vehicle 10 may has an ultrasonic wave sonar and/or a laser radar for obtaining the target information.

The driving assist ECU 20 of the present embodiment employs the condition (TR) as the right turn determination condition. Similarly, the driving assist ECU 20 employs the condition (TL) as the left turn determination condition. However, either one of or both the right turn determination condition and the left turn determination condition may differ from those employed in the present embodiment. For example, in the case where the vehicle 10 has a yaw rate sensor for detecting the yaw rate YR of the vehicle 10, the driving assist ECU 20 may determine that the right turn determination condition is satisfied when the yaw rate YR represents a rotational motion of the vehicle 10 in the clockwise direction and the magnitude of the yaw rate YR is greater than a predetermined threshold. Similarly, the driving assist ECU 20 may determine that the left turn determination condition is satisfied when the yaw rate YR represents a rotational motion of the vehicle 10 in the counterclockwise direction and the magnitude of the yaw rate YR is greater than the predetermined threshold.

Alternatively, the driving assist ECU 20 may determine that the right turn determination condition is satisfied when the time of continuation of the state in which the yaw rate YR represents a rotational motion of the vehicle 10 in the clockwise direction and the magnitude of the yaw rate YR is greater than a predetermined threshold is longer than a predetermined threshold time. Similarly, the driving assist ECU 20 may determine that the left turn determination condition is satisfied when the time of continuation of the state in which the yaw rate YR represents a rotational motion of the vehicle 10 in the counterclockwise direction and the magnitude of the yaw rate YR is greater than the predetermined threshold is longer than a predetermined threshold time.

Alternatively, the driving assist ECU 20 may determine that the right turn determination condition is satisfied when the steering angle θs is larger than the clockwise angle threshold θRth. In addition, the driving assist ECU 20 may determine that the left turn determination condition is satisfied when the steering angle θs is smaller than the counterclockwise angle threshold θLth.

Further, the driving assist ECU 20 may determine whether the vehicle 10 is making a right turn or a left turn on the basis of the present position of the vehicle 10 and map information. For such determination, the vehicle 10 may include a satellite positioning section which receives signals from satellites of a satellite positioning system (for example, GPS: Global Positioning System) and obtains the present position of the vehicle 10, and a map database which contains information (map information) of various intersections and roads extending to each of the intersections. Specifically, the driving assist ECU 20 may determine that the right turn determination condition is satisfied when the vehicle 10 is located in an intersection and is heading toward a road which the vehicle 10 will enter as a result of a right turn at that intersection. Similarly, the driving assist ECU 20 may determine that the left turn determination condition is satisfied when the vehicle 10 is located in an intersection and is heading toward a road which the vehicle 10 will enter as a result of a left turn at that intersection.

Further, the driving assist ECU 20 may determine that the right turn determination condition is satisfied when the winker lever of the vehicle 10 is operated in a direction for right turn. Similarly, the driving assist ECU 20 may determine that the left turn determination condition is satisfied when the winker lever of the vehicle 10 is operated in a direction for left turn.

The driving assist ECU 20 of the present embodiment changes the process execution condition when the vehicle 10 is making a right turn and when the vehicle 10 is making a left turn. However, the driving assist ECU 20 may be configured to change the process execution condition when the vehicle 10 is making a right turn but not to change the process execution condition when the vehicle 10 is making a left turn. Similarly, the driving assist ECU 20 may be configured to change the process execution condition when the vehicle 10 is making a left turn but not to change the process execution condition when the vehicle 10 is making a right turn.

Both the first angle θth1 and the second angle θth2 in the present embodiment are 50°. Both the third angle θth3 and the fourth angle θth4 in the present embodiment are 360°. However, either one of or both the first angle θth1 and the second angle θth2 may be an angle other than 50°. Further, the third angle θth3 may be an angle other than 360° so long as the third angle θth3 is larger than the first angle θth1. Similarly, the fourth angle θth4 may be an angle other than 360° so long as the fourth angle θth4 is larger than the second angle θth2.

The first time threshold Tth1 in the present embodiment is a fixed value. However, the first time threshold Tth1 may vary with the positional relation between the vehicle 10 and an obstacle. For example, the first time threshold Tth1 may be set such that its value increases with a lap ratio which is calculated as the ratio of a "length (in the lateral direction of the vehicle 10) of a portion of the vehicle 10 which comes into contact with an obstacle when the vehicle 10 collides with the obstacle" to the width Wo of the vehicle 10.

The second time threshold Tth2 in the present embodiment is a fixed value. However, the second time threshold Tth2 may be a value which increases as the vehicle speed Vs decreases.

The maximum deceleration Dcmax in the present embodiment is a fixed value. However, the maximum deceleration Dcmax may vary with conditions. For example, in the case where slippage occurs between the wheels of the vehicle 10 and a road surface when the value of the target deceleration Dctgt increases gradually, the driving assist ECU 20 may employ, as the maximum deceleration Dcmax, a value slightly greater than the acceleration As at that time (the acceleration As has a negative value in this case); i.e., a negative value whose absolute value is smaller than that of the acceleration As at that time.

Alternatively, when the slippage having occurred between the wheels of the vehicle 10 and the road surface ends as a result of a gradual decrease in the value of the target deceleration Dctgt, the driving assist ECU 20 may employ, as the maximum deceleration Dcmax, a value slightly greater than the acceleration As at that time; i.e., a negative value whose absolute value is smaller than that of the acceleration As at that time. In other words, the vehicle 10 may include an antilock brake mechanism. In such a case, the target deceleration of the vehicle 10 determined when the antilock brake mechanism operates is employed as the maximum deceleration Dcmax.

What is claimed is:

1. A driving assist apparatus comprising:
    an obstacle detection section which detects an obstacle present in a heading direction of a vehicle;
    a steering angle sensor which detects a steering angle which is a rotational position of a steering wheel of said vehicle represented by an operation direction of said steering wheel and an operation amount of said steering wheel from a neutral position;
    a collision possibility determination section which determines a possibility of said vehicle colliding with said obstacle;
    an execution condition determination section which determines that a process execution condition is satisfied when said steering angle falls within a range between a rotational position which is a clockwise direction reference position which said steering wheel reaches when said operation direction is a clockwise direction and said operation amount is a predetermined first angle and a rotational position which is a counterclockwise direction reference position which said steering wheel reaches when said operation direction is a counterclockwise direction and said operation amount is a predetermined second angle; and
    a collision avoidance process execution section which executes a collision avoidance process, including at least one of a process of providing a warning to a driver of said vehicle and a process of decreasing speed of said vehicle, when said collision possibility determination section determines a possibility of said vehicle colliding with said obstacle and said execution condition determination section determines that said process execution condition is satisfied, wherein said execution condition determination section executes at least one of a clockwise adjustment process of changing said clockwise direction reference position to a predetermined third angle larger than said first angle when said vehicle is determined to be making a right turn and a counterclockwise adjustment process of changing said counterclockwise direction reference position to a predetermined fourth angle larger than said second angle when said vehicle is determined to be making a left turn,
wherein said execution condition determination section executes at least one of a process of determining that said vehicle is making a right turn in a case where a state in which said operation direction is in the clockwise direction and said operation amount is larger than a predetermined clockwise angle threshold continues beyond a predetermined clockwise continuation time at the time when said clockwise adjustment process is performed and a process of determining that said vehicle is making a left turn in a case where a state in which said operation direction is in the counterclockwise direction and said operation amount is larger than a predetermined counterclockwise angle threshold continues beyond a predetermined counterclockwise continuation time at the time when said counterclockwise adjustment process is performed.

2. A driving assist apparatus according to claim 1, wherein said execution condition determination section executes at least one of a process of determining that said vehicle is making a right turn in a case where said steering angle represents a state in which the operation direction of said steering wheel is the clockwise direction and the operation amount of said steering wheel is larger than a predetermined right turn angle and a process of determining that said vehicle is making a left turn in a case where said steering angle represents a state in which the operation direction of said steering wheel is the counterclockwise direction and the operation amount of said steering wheel is larger than a predetermined left turn.

* * * * *